United States Patent [19]
Rentz

[11] 3,859,020
[45] Jan. 7, 1975

[54] CREATIVE TOY FOR PRODUCING OBJECTS HAVING PATTERNS OF VARIABLE COLORATION AND/OR DESIGN

[76] Inventor: Robert I. Rentz, 1818 Devils Backbone Rd., Cincinnati, Ohio 45238

[22] Filed: Mar. 19, 1970

[21] Appl. No.: 20,883

[52] U.S. Cl. ......... 425/130, 425/DIG. 51, 425/173, 425/247, 425/183
[51] Int. Cl. .............................................. B29f 1/12
[58] Field of Search ......... 18/DIG. 57, 3.5, 30 AM, 18/30 AH, 30 LM, 30 LA, 30 QM, 30 QF, 30 QQ, 5.3 R, 5.3 F, 5.3 H, 5.3 P, 30 QH; 425/173, DIG. 57, 130

[56] References Cited
UNITED STATES PATENTS
3,157,933  11/1964  Boggild et al. ............... 425/DIG. 57
3,574,897  4/1971  Citron et al. ................. 425/DIG. 57
3,590,749  7/1971  Burns et al. ........................ 425/173

Primary Examiner—Andrew R. Juhasz
Assistant Examiner—David S. Safran
Attorney, Agent, or Firm—Wood, Herron & Evans

[57] ABSTRACT

A creative toy including an injection mold having a molding cavity covered at least in part by a transparent panel to render the interior thereof visible to the user during the molding process, and an injection mechanism for sequentially and/or simultaneously injecting into said cavity flowable material selectively different as to color and/or amount to produce, while visually observing the same, patterns of variable color and/or design, the particular pattern design and color being dependent upon the sequence of the colors injected into the molding cavity as well as the quantity of each color injected.

13 Claims, 21 Drawing Figures

PATENTED JAN 7 1975

INVENTOR.
BY Robert J. Rentz
Wood, Herron & Evans
ATTORNEYS

CREATIVE TOY FOR PRODUCING OBJECTS HAVING PATTERNS OF VARIABLE COLORATION AND/OR DESIGN

This invention relates to creative toys and methods which permit the child to produce objects having patterns selectively variable as to color and/or design, and more particularly to toys and methods which use flowable materials, such as modeling compounds, of different colors to produce three-dimensional objects having patterns which are selectively variable as to color and/or design.

The value of creative toys for developing a child's mind as well as for his amusement has not become well established and accepted. A "creative toy" as used herein means a toy which, in addition to amusing the child, permits the child to use and develop his creative, imaginative and artistic talents by authoring an original work, such as a two- or three-dimensional design, drawing, fabrication, assemblage, or the like. Creative toys take many forms. By way of example, some creative toys utilize a circular, internally-toothed track and an eccentrically apertured, peripherally-toothed disc which travels around the track to produce epicycloidal patterns, the patterns being produced by the point of a pencil guiding in the disc aperture as the disc revolves in the course of traveling in its circular path around the track. Variation in pattern design and color can be obtained by using different sized discs and differently colored pencils, thus introducing the elements of originality, creativity, and imagination into the child's artistic work. Another form of creative toy utilizes multi-colored and multi-shaped building blocks which permit the child to create original, artistic and imaginative three-dimensional structure of various shapes and/or colorations. Other creative toys use still other mediums of expression. For example, some creative toys use modeling compounds of various colors. One such toy utilizes, on conjunction with modeling compounds, a mold having a coin-shaped molding cavity for producing replicas of coins of varying color. Creative toys of the foregoing and similar type, to one degree or another, enable the child, while authoring an original work, in addition to amusing himself, to also develop his creative, imaginative, and artistic talents.

In the design of a creative toy, particularly one which is to be a success commercially, a number of factors must be considered. For example, the initial cost of the toy is important. If the toy is too expensive, due to either the amount or kind of materials and/or assembly required, the chances for success in the marketplace are reduced. Also important from a cost standpoint is the cost of materials consumed, if any, in the use of the toy by the child. If a creative toy uses modeling compound, the amount used cannot be excessive, otherwise its cost of use will be prohibitive and inhibit its success. Another major factor is the durability of the toy. It is essential that the toy not be unduly fragile, making its useful life unreasonably short. It is also important that the toy be easy to use, particularly if it is to be used by young children. Ease of use implies that it be both uncomplicated to use as well as require no undue amount of physical strength, that is, that its use produce neither mental nor physical strain. It is also very desirable that the toy appeal to children whose ages vary over an appreciable range. In this way the market base for the toy is broadened. The toy should also be amusing to the child to a degree sufficient to maintain his interest in using it for a reasonably long period of time. In other words, the toy should not become boring after only a short period of use. Finally, the toy should be designed to produce a high degree of development of the child's creative talents in the course of its use.

It has been an objective of this invention to produce a creative toy which is economical in design and use, simple and easy to operate, appeals to children of varying ages, and is both very amusing and helpful in developing the creative, imaginative and artistic talents of the child using it. This objective has been accomplished in accordance with certain of the principles of this invention by providing a toy which enables a child to produce original, three-dimensional patterend objects whose design and coloration can be selectively varied by the child for the purposes of both amusement of the child and development of the child's creative, imaginative and artistic talents.

In a preferred form, the toy of this invention includes an injection mold having a molding cavity whose interior is capable of being viewed during the molding process by the child, and an injecting mechanism for permitting the child to selectively inject into the molding cavity, while observing the same, flowable material which is variable continuously and at the child's discretion both as to color and quantity. With the toy of this invention, an original three-dimensional object can be produced having a pattern whose coloration and design is controlled entirely by the child by virtue of his selection and variation of both the sequence and quantity of flowable materials of different colors he elects to inject into the molding cavity in the course of the molding operation. Also, since the child at all times during the molding process can view the interior of the molding cavity, he can monitor the progress of the molded object at different stages in its production. By virtue of being able to continuously visually observe the object being created in its various stages of development, the child can continuously alter or modify any preconceived sequence of colors and/or quantities which he had initially programmed in his mind if at any time he is unsatisfied with the coloration and/or design of the pattern being produced. The cavity viewing feature also enables the child to see when the mold is filled and the molded object completed.

In accordance with one preferred embodiment of this invention, an injection mold is provided having a molding cavity in the form of a thin wafer or disc, the interior of which has a central orifice and is viewable to permit the child to observe the molding operation. Associated with the mold are a plurality of independently operable injection mechanisms, each containing a supply of differently colored flowable material. The injection mechanisms can be operated either simultaneously or sequentially, and at different injection flow rates, for injecting, via the orifice, flowable materials of different colors into the molding cavity in varying sequence and/or quantities. With this embodiment, assuming there are four injection mechanisms, each supplying a different color flowable material, and that the injection mechanisms are operated sequentially, a four-color disc or wafer may be molded comprised of, for example, annular rings whose coloration and radial thickness vary depending, respectively, upon the sequence in which the invidual colors are separately injected and the quantity of each color injected. Alternatively, by simultaneous operation of the injection mechanisms, a four-color disc can be molded comprising, instead of annular rings, differently colored sectors in the form of quadrants of a circle.

In accordance with another embodiment of this invention, an injection mold is provided in which the visually observable wafer or disc-shaped molding cavity is fed by only a single injection mechanism of a design such that it can be charged with pellets of flowable material selectively variable as to both color and size. With the toy of this embodiment, molded discs having patterns of annular rings varying in both color and radial dimension of the type provided by the multi-injector embodiment can be produced with only a single injection mechanism. Thus, a simple and inexpensive toy is produced, yet one which provides a great deal of creavity.

Each of the two foregoing embodiments, in a preferred form, consists of upper and lower plate-shaped molding members, the upper member of which is transparent to allow viewing of the molding cavity during the molding process. The bottom molding member is provided with one or more bores which communicate with the molding cavity via an orifice, and associated pistons movable within the bores for selectively injecting flowable material in the molding cavity via the orifice. Utilization of a piston/bore injection mechanism formed in the lower molding member provides a particularly simple and inexpensive method of injecting flowable material into the molding cavity in varying amounts and colors as required to produce the patterns of varying coloration and design of this invention.

A further advantage of either of the above-described single or multiple injection mechanism embodiments of this invention is that the toy is very efficient from the standpoint of flowable material consumed. Specifically, since the molding cavity is in the form of a wafer or disc, a finished object of significant surface area, having a quite varied pattern as to both coloration and design, can be produced, yet large quantities of flowable material are not required due to the thinness of the finished object.

These and other advantages and objectives of the invention will become more readily apparent from a detailed description thereof taken in connection with the following description of the drawings in which:

FIG. 19 is a perspective view, partially exploded, of a modification of the toy embodiment depicted in FIGS. 1–4 in which a mask defines the periphery of the molding cavity;

In accordance with one preferred embodiment depicted in FIGS. 1–4, the toy of this invention includes a mold 10 provided with a plurality of injection mechanisms 12–1 to 12–4 which function to selectively inject flowable material into a molding cavity 14. The mold 10 includes a lower mold member 16 and an upper mold member 18. The lower and upper mold members 16 and 18 are movable relative to each other between amolding position depicted in FIGS. 1 and 2 wherein the mold members are in substantial parallelism and their respective confronting upper and lower surfaces 20 and 22 define the molding cavity 14, and a non-molding position (not shown) wherein the upper and lower molding members are displaced from each other a distance sufficient to permit access to the molding cavity by the user.

Figures 1, 2, 3, 4, 5:
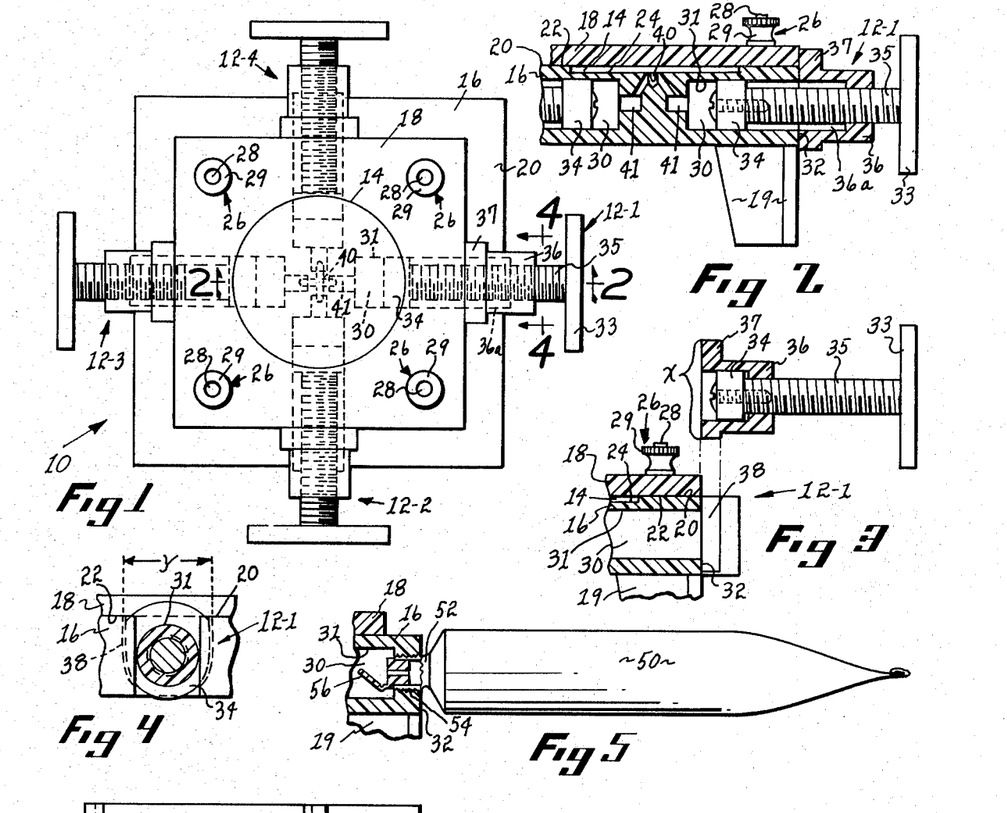
FIG. 1 is a plan view of one embodiment of the invention.
FIG. 2 is a cross-sectional view taken along line 2—2 of FIG. 1.
FIG. 3 is a cross-sectional view, partially exploded, taken in the direction of line 2—2 of FIG. 1 showing the piston disengaged from the lower mold member.
FIG. 4 is a cross-sectional view taken along line 4—4 of FIG. 1.
FIG. 5 is a vertical cross-sectional view taken through the reservoir of a modified form of the toy of FIGS. 1–4.

As shown in FIGS. 1 and 2, the lower molding member is in the form of a square block or plate, although other configurations are equally possible, and is provided with depending corner legs or supports 19. Preferably, the lower mold member 16 is fabricated of plastic. It is understood, of course, that the lower mold member 16 may be fabricated of other materials, such as metal or ceramic. In a preferred form, the upper surface 20 of the lower mold member 16 is provided with a shallow depth, centrally located circular cavity, well or recess 24, which defines a molding zone. The remainder of the surface 20 constitutes a non-molding zone. The recess 24, in combination with that portion of the lower surface 22 of the upper mold member 18 which overlies it, establishes or defines, when the mold members 16 and 18 are in their molding shown in FIG. 2, the molding cavity 14.

The upper mold member 18 is in the form of a square block or plate, although other shapes are possible, and has an area exceeding that of the molding cavity 14 to facilitate sealing the recess 24 in the lower mold member 16 when the mold members are in the molding position. The lower surface 22 of the upper mold member 18 is preferably planar. However, surface 22 may be provided with a shallow, centrally disposed circular cavity, well or recess of the type provided in the upper surface 20 of the lower mold member 16 either as a substitute for recess 24, or in addition to recess 24 if a deeper molding cavity 14 is desired.

The upper mold member 18, at least that portion which overlies the molding cavity 14, preferably is fabricated of material which permits the user to view the interior of the molding cavity 14 when the toy is in use, and this visually monitors the progress of the molding operation. The lower molding member 16, at least in the area of the injection mechanisms 12-1 to 12-4, is preferably fabricated of material which permits the user to observe the interior of the injection mechanism and thus monitor the injection process and the supply of flowable material remaining in the injection mechanisms. Accordingly, the upper and lower mold member 18 and 16 are, in the preferred form, constituted of transparent material, such as clear plastic or glass. The term "transparent" is used in a relative sense and is meant to include materials which may be tinted or otherwise less than absolutely clear, but yet not substantially opaque such as would prevent the user from observing the interiors of the cavity 14 and the injection mechanisms 12-1 to 12-4.

Clamping means 26 selectively connect the lower and upper molding members 16 and 18 to maintain the molding members in the molding position shown in FIG. 2 when it is desired to inject flowable material into the cavity 14. The clamping means 26 can take any of a variety of different forms, and in accordance with one preferred form include screws 28 and nuts 29. The screws 28 have their lower extremities anchored in the lower mold member 16, and their upper extremities projecting perpendicularly from the surface 20 a distance exceeding the thickness of the upper mold member 18. The nuts 29 threadably engage portions of the screws 28 projecting above the upper mold member 18 to fasten the upper and lower mold member 18 and 16 in the molding position shown in FIG. 2 in which the confronting surfaces 20 and 22 thereof are in contact.

The injecting mechanisms 12-1 to 12-4 are identical in structure and, hence, only injection mechanism 12-1 is described in detail. The injection mechanism 12-1, which is associated with the lower mold member 16, includes a reservoir 30 in the form of a circular cross-section bore of hole 31 extending inwardly from a side surface 32 of the lower mold member to a point slightly short of the center of the lower mold member. A piston or plunger 34 is slidingly positioned within the bore 31. The piston 34, which has a circular cross-section, is reciprocable, or movable, along the axis of the bore 31 by a screw 35. Screw 35 is secured at its inner end to the piston 34 and at its outer end to a gripping knob 33. A nut 36 is threaded on the screw 35. The nut 36 is provided with a collar 37 which is removably received in a vertical slot 38 formed in the marginal region of the upper surface 20 of the lower mold member 16. The vertical dimension X of the collar 37 exceeds its horizontal dimension Y in order that when the nut collar 37 is inserted into the slot 38, the nut 36 remains stationary relative to the lower mold member 16. In operation, when the screw 35 is rotated relative to the nut 36, the piston 34 reciprocates, either advancing or retracting relative to the reservoir 30, depending upon the direction of rotation of the knob 33. In this embodiment the pistons 34 are in a common plane, and symmetrically disposed relative to the orifice 40.

The lower mold member 16 is provided with an orifice 40 which is preferably centrally disposed relative to the molding cavity 14. The orifice 40 at its upper end communicates with the molding cavity 14 and at its lower end communicates with the innermost, or discharge, end of each of the reservoirs 30 of injector mechanisms 12-1 to 12-4 via passages 41 of any convenient shape.

To mold an object with the toy of FIGS. 1-4, the reservoirs 30 of each of the injection mechanisms 12-1 to 12-4 are charged with flowable material. Reservoir charging is easily accomplished by rotating the knob 33 in a direction such that the screw 35 retracts relative to the nut 36 a distance sufficient to position the piston 34 entirely within an oversized bore 36a of the nut 36. With the piston positioned in the bore 36a, the nut 36 can be removed from its associated slot 38 by lifting the nut verticalaly from the position shown in FIGS. 2 and 4 to the position shown in FIG. 3. With the nut 36 in the position shown in FIG. 3, flowable material may be inserted into the reservoir 30, via the outer open end of bore 31, in any suitable manner such as by hand. When the reservoir 30 has been charged, the nut 36 is returned to its operative position, with the collar 37 engaged in the slot 38, and the knob 33 turned to cause the screw 35 to advance the piston 34 into engagement with the flowable material in the reservoir.

Assuming the upper and lower mold members 18 and 16 are clamped in their molding position with their confronting surfaces 20 and 22 in contact. The molding operation is initiated by selectively injection flowable material into the molding cavity 14 via the orifice 40. Injection is accomplished by advancing the pistons 34 relative to their respective reservoirs 30.

Figure 15:
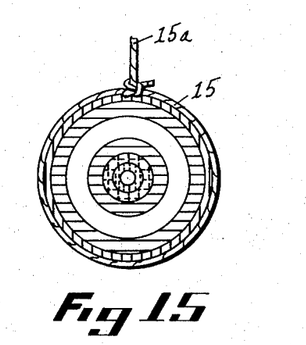
Figure 16:
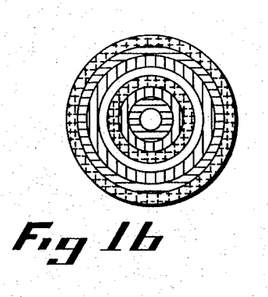
Figure 17:
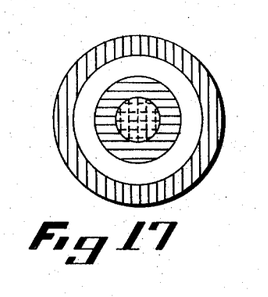

The pistons 34 can be advanced singly, or one or more pistons may be advanced simultaneously. If the reservoirs 30 of injector mechanism 12-1 to 12-4 are charged with flowable materials having different colors, activation of the pistons 34 singly will result in the formation of a thin disc-like object such as shown in FIGS. 15, 16 and 17, having a plurality of annular rings. The colors of the annular rings depend upon the sequence in which the pistons 34 are actuated, as well as the colors in the separate reservoirs 30. For example, if the reservoirs of injector mechanisms 12-1 to 12-4 contain red, white, blue and yellow flowable material, the disc of FIG. 17 can be produced by activating the injection mechanisms 12-1 to 12-4 in the following order: 12-1, 12-2, 12-3 and 12-4. The disc of FIG. 16 can be produced by the following order of injection mechanism actuation: 12-4, 12-3, 12-1, 12-2, 12-4, 12-1, 12-3 and 12-2. The radial thickness of the annular rings depends upon the extent to which the pistons 34 of injection mechanisms 12-1 to 12-4 are advanced, with thickness increasing as piston advancement increases. The amount of piston advance for the disc of FIG. 16 per actuation of an injection mechanism 12-1 to 12-4 is less than that for the disc of FIG. 17.

Figure 13:
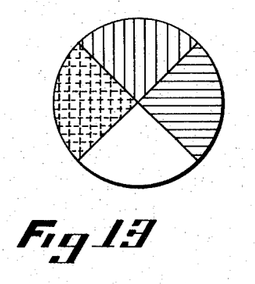
FIGs. 13–18 are plan views of differently colored and/or configured articles capable of being produced with the toy embodiments of this invention.
Figure 14:
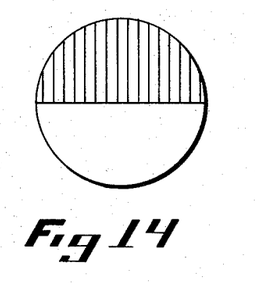

If the pistons 34 of injector mechanisms 12-1 to 12-4 are advanced simultaneously and to the same extent a thin disc-shaped object such as shown in FIG. 13 will be produced having four sectors in the form of quadrants whose respective colorations correspond to the colors in the separate reservoirs 30 of the injecting mechanism 12-1 to 12-4. If the pistons 34 of the injection mechanisms 12-2 and 12-4 are operated simultaneously and to the same extent, a thin disc-shaped object will be produced such as shown in FIG. 14 having two sectors in the form of semi-circular sections whose colors correspond to the colors in the separate reservoirs 30 of injection mechanisms 12-2 and 12-4. An object similar to that depicted in FIG. 14, but rotated 90° and having the colors of the flowable material in the reservoirs 30 of injection mechanisms 12–1 and 12–3 will be produced if the pistons of these injection mechanisms are simultaneously and equally advanced.

If desired, a piece of string, yarn, thread, ribbon or the like may be positioned around the periphery of the molding cavity 14 prior to injection of flowable material into the cavity. When a piece of string or the like is so positioned and flowable material thereafter injected into the molding cavity 14, the perimeter of the disc-like object formed in the molding cavity will adhere to the string, producing a disc-like object of the type shown in FIG. 15 which has adhered to and surrounding its periphery one length of string 15. The string 15, particularly the free end thereof 15a, facilitates suspending the disc-like object for decorative purposes.

Instead of injection mechanisms 12–1 to 12–4 of the piston type depicted in FIGS. 1–4, other suitable injection schemes may be utilized. For example, a collapsible tube 50 containing flowable material may be provided, as shown in FIG. 5. The collapsible tube 50 is secured to the reservoir 30 in any suitable manner such as by threading the neck 52 of the tube 50 into the opening 54 in the reservoir. Preferably a one-way, or check, valve 56 is provided in the neck 52 of the tube 50. The one-way, or check, valve 56 insures that when a tube 50 is collapsed, and flowable material therein forced out, that flowable material in the reservoirs associated with the tubes not being collapsed at that time is not returned to such tubes. If such return did occur, the flowable material in the reservoir of the collapsed tube would bypass the molding cavity and pass instead into the reservoirs of the noncollapsed tubes, forcing the material already therein back into their respective non-collapsed tubes.

If desired, the shape of the disc-like object formed in the molding cavity 14 can be varied by changing the shape of the shallow recess 24 formed in the upper surface 20 of the lowermold member 16. For example, the recess 24, instead of being circular can be square, star-shaped, or the like, producing similarly shaped molded objects. Alternatively, the circular recess 24 can be provided with inserts or annular masks, such as masks 60–63 of FIGS. 9–12, having variously shaped central apertures 64–67. The shape of apertures 64–67 defines the shape of the resultant disc-like object molded in the cavity, and may make variety of forms depending upon the ultimate shape desired for the molded object. For example, the apertures 64–67 may take the form of a star, a butterfly, a leaf, or a letter of the alphabet, respectively, to mention just a few. The thickness of the makes 60–63 preferably is equal to the height of the cavity 24, although it can be larger if a thicker molded disc-like object is desired. The coloration of the uniquely shaped molded article produced using masks 60–63 can be varied in the same manner as described in connection with producing the circular molded discs of FIGS. 13–17. For example, if a mask (not shown) having a square aperture is placed in the cavity 24 of the lower mold member 16 and injection mechanisms 12–1 to 12–4 are operated sequentially, a disc-like article, shown in FIG. 18, having a square shape and differently colored, generally annular rings will be produced.

Figure 6:
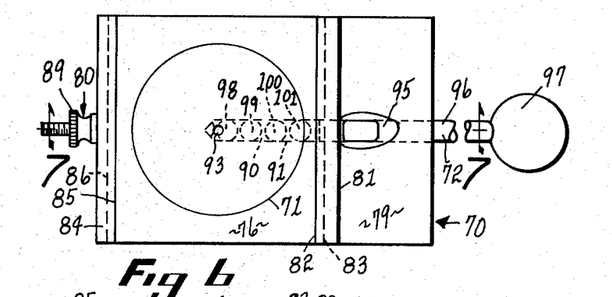
FIG. 6 is a plan view of another modification of the toy of this invention.
Figure 7:
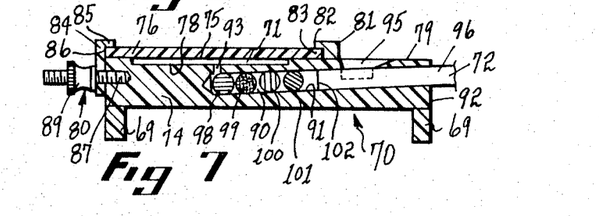
FIG. 7 is a cross-sectional view taken along line 7—7 of FIG. 6.

In accordance with another preferred embodiment depicted in FIGS. 6 and 7, the toy of this invention includes a mold 70 having a molding cavity 71 and a flowable material injecting mechanism 72. The mold 70, considered in more detail, includes a lower molding member 74 in the form of a rectangular base, block, plate or panel having depending legs 69, and an upper molding member 76 in the form of a square panel or plate. The molding members 74 and 76 are relatively movable between a molding position (shown in FIG. 7) in which the members are in substantial parallelism with their confronting surfaces establishing the molding cavity 71, and a non-molding position (not shown) wherein the members are spaced to facilitate access to the cavity 71. The upper surface of the lower mold member 74 is divided into a molding zone 78 in the form of a shallow depth, circular well, recess or cavity, and a non-molding zone which includes that portion of the upper surface of the lower mold member 74 which is not in the molding zone 78. The lower mold member 74, like the lower molding member 16 of the toy of FIGS. 1–4, preferably is fabricated of transparent plastic to facilitate viewing of injection mechanism 72, although other materials, transparent or non-transparent, may be utilized.

The upper mold member 76 is preferably planar, having a flat lower surface 75 which, in combination with the molding zone or cavity 78 of lower mold member 74, defines the molding cavity 71. The upper molding member 76 includes a section which overlies the shallow cavity or molding zone 78, as well as a section which overlies a marginal section of the non-molding surface 79 circumscribing the cavity 78. The upper plate 76, at least that portion thereof overlying the shallow cavity 78, is preferably fabricated of transparent material to permit the interior of the cavity to be viewed by the user when the upper and lower molding members 76 and 74 are in the molding position depicted in FIG. 7.

Clamp means 80, taking any convenient form, are provided to maintain the upper and lower molding members 76 and 74 in the molding position shown in FIG. 7 during the molding process. The clamp 80 includes a longitudinal flange strip 81 secured to the non-molding zone of the lower mold member 74. The flange strip 81 has a lip 82 adapted to overlie the associated edge 83 of the upper molding member 76. The clamp 80 also includes a flange strip 84 having a lip 85 adapted to overlie the associated edge 86 of the molding member 76. A screw 87, having its inner end anchored in the lower molding member 74 and its outer end projecting horizontally therefrom, cooperates with a nut 89 threadable thereon for clamping the upper mold member 76 relative to the lower mold member 74 in the molding position shown in FIG. 7.

In operation, the upper and lower mold members 76 and 74 are secured in the molding position shown in FIG. 7 to define a molding cavity 71 by sliding the edges 83 and 86 of the upper mold member between the lips 82 and 85 of the flange strips 81 and 84 to a point such that the lower surface of the upper mold member overlies the recess 78. The nut 89 is then threaded tightly on the screw 87, clamping the upper mold member 76 relative to the lower mold member 74. The upper mold member 76 can be moved to a non-molding position (not shown) relative to the lower mold member 74 by loosening the nut 89, removing strip 84 and tilting and lifting the upper mold member 76 from beneath the flange 81 to a point wherein the upper mold member does not overlie the cavity or molding zone 78 of the lower mold member 74. With the upper mold member 76 positioned, the cavity or molding zone 78 is accessible by the user for removal of an article previously molded in the cavity 71.

The injection mechanism 72 includes a reservoir 90 associated with the lower mold member 74 in the form of a downwardly sloping circular cross-section bore or hole 91 formed in the lower mold member. Reservoir bore 91 extends at its inner, or discharge, end to a point underlying the center of the mold cavity 71, and at its outer end to the side surface 92 of the lower mold member 74. An orifice 93 is provided in the lower mold member 74. Orifice 93 communicates at its upper end with the center of the molding cavity or zone 78, and at its lower end with the discharge, or inner, end of the reservoir 90. A reservoir-charging passage 95 is also formed in the lower molding member 74. The passage 95 at its upper end communicates with the non-molding zone 79 and at its lower end with the reservoir 90. Slideably positioned within the bore 91 of the reservoir 90 is a reciprocable piston 96 in the form of a circular cross-section rod terminating at its outer end in a large diameter ball or handle 97 which can be conveniently grapsed by the user's hand.

The reservoir 90 is charged with flowable material in the form of, for examaple, spherical pellets 98, 99, 100 and 101, by retracting the piston rod 96 to a point such that its inner end 102 is outboard of the reservoir-charging passage 95 so as not to block the charging passage. With the piston rod 96 so positioned, the pellets 98, 99, 100 and 101 are sequentially inserted through the charging passage 95 into the reservoir 90. The size and color of the pellets 98–101 can be varied in accordance with the radial thickness and coloring desired for the annular rings of the resultant disc-like article which is produced in a manner to be presently described.

Figures 18, 21:
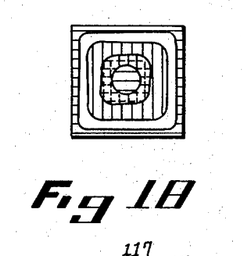
FIG. 21 is a perspective view, partially exploded, of a modification of the toy embodiment depicted in FIGS. 6 and 7 in which the molding cavity is defined by spaces or shims between the upper and lower molding members and the reservoir is in the form of a hollow tube secured to the bottom surface of the lower molding member.

When the reservoir 90 is suitably charged with pellets 98-101 of flowable material, the piston rod 96 is urged toward the inner, or discharge, end of the bore 91 causing the pellets 98-101 of moldable material to be forced through the orifice 93 into the molding cavity 71, producing a circular, disc-shaped object of the type shown, for example, in FIGS. 16 and 17, having annular rings whose radial thickness and coloring depends, as indicated, on the manner in which the reservoir 90 is charged. The shape of the article produced in the molding cavity 71 can be altered by altering the shape of the cavity or molding zone 78. For example, if a square disc-like object of the type shown in FIG. 18 is desired, the cavity 78, instead of being circular, could be made in the shape of a square. Alternatively, an annular mask (not shown) having a square aperture could be positioned within the circular cavity 78 to produce a square disc-shaped object of the type depicted in FIG. 18. As used herein, the term "disc" is not limited to objects having only a circular shape, but rather is meant to include wafer-like objects, or discs, of any shape such as triangular, square, elliptical, and other curved and polygonal shapes.

In accordance with a further embodiment of this invention, as depicted in FIG. 21, a mold 110 is provided which includes a lower molding member in the form of a flat plate or block 111 and an upper molding member in the form of a flat plate or block 112. Preferably both blocks 111 and 112 are transparent. For the purpose of defining a molding cavity between the upper and lower confronting surfaces 113 and 114 of the lower and upper molding members 111 and 112, spacers in the form of shims or washers 115 are provided intermediate the confronting surfaces 113 and 114 at the corners of the molding members. The shims or washers 115, when the plates 111 and 112 are urged toward each other to a molding position, maintain the confronting surfaces 113 and 114 at a predetermined spacing, thereby establishing a molding cavity between the confronting surfaces 113 and 114 of the molding plates 111 and 112. When the plates are not urged toward each other, access to the molding cavity is possible. Suitable clamp means in the form of screws 116 having their lower ends anchored in the lower plate 112 and their upper ends projecting through suitable apertures in the upper plate for threaded engagement with nut 117 are provided to clamp the upper and lower plates 111 and 112 together in the molding position, wherein the spacers 115 are intimately sandwiched between the spaced confronting surfaces 113 and 114 of the plates 111 and 112.

To inject flowable material into the molding cavity defined by spaced confronting surfaces 113 and 114 of clamped plates 111 and 112, an orifice 118 is provided in the lower plate 111. The orifice 118 at its upper end communicates with the molding cavity defined by spaced confronting surfaces 113 and 114 of clamped plates 111 and 112, and at its lower end communicates with the bottom surface 119 of the lower plate 111. A hollow tube 120, preferably circular in cross-section, having its inner end 121 plugged is secured to the bottom surface 119 of the lower plate 111 in a manner such that an aperture 120a formed in the hollow tube 120 adjacent the inner plugged end thereof communicates with the lower end of the orifice 118. The outer end of the tube 120 is open for reasons to become apparent.

The interior of the hollow tube 120 functions as a reservoir for storing flowable material. The interior of the tube 120, constituting the reservoir, can be charged with flowable material by inserting flowable material in the form, for example, of differently colored spherical pellets, into the interior of the tube 120 via the outer open end thereof. When the interior of the tube 120 or reservoir is suitably charged with flowable material, a piston rod 122, slideably insertable in the hollow tube 120 via the open end thereof and having a cross-section similar to that of the tube, is inserted therein and advanced toward the orifice 118. This forces the flowable material from the interior of the hollow tube 120, or reservoir, through the orifice 118 into the molding cavity defined by the confronting surfaces 113 and 114 of the clamped mold members 111 and 112 to form a circular disc-shaped object of the type shown, for example, in FIGS. 16 and 17. If desired, a reservoir-charging passage similar to passage 95 of the embodiment of FIGS. 6 and 7 can be provided in the hollow tube 120 at a point spaced inwardly from the outer end thereof to facilitate charging of the reservoir defined by the interior of the hollow tube 120 without totally removing the piston rod 122 from within the tube 120.

A number of modifications of the toys described herein may be made. For example, in the embodiment depicted in FIGS. 1–4 and in FIGS. 6–7, instead of providing the upper surfaces 20 and 79 of the lower mold members 16 and 74, respectively, with shallow cavities or recesses 24 and 78, respectively, the shallow cavities can be eliminated, leaving the upper surfaces of the lower mold members flat. If such is desired, molding cavities may be provided by placing masks of the type shown in FIGS. 9-12, having central apertures therein, between the planar confronting surfaces of the upper and lower mold members. For example, if it is desired to eliminate the shallow cavity 24 in the upper surface 20 of the lower molding member 16 of the toy of FIGS. 1-4, as shown in FIG. 19, the upper surface 20' of the lower molding member 16' can be made substantially planar and a mask 60'-63' of a type similar to that shown in FIGS. 9-12 having a central aperture 64'-67', can be interposed between the confronting surfaces 20' and 22' of the lower and upper mold members 16' and 18'. In such case the central aperture 64'-67' of mask 60'-63' defines, in conjunction with the confronting surfaces 20' and 22' overlying and underlying the central aperture 64'-67' a molding cavity when the molding members 16' and 18' are clamped in sandwiching relation to the mask.

If it is desired to eliminate the cavities 24 and 78 formed in the upper surfaces 20 and 79 of the lower mold members 16 and 74 of the devices of FIGS. 1-4 and FIGS. 6-7, respectively, and it is not desired to use masks 60'-63' similar to the type depicted in FIGS. 9-12, spacers or shims of the type shown in FIG. 21 and identified by reference numeral 115 may be utilized in the manner disclosed in connection with FIG. 21 with the toy embodiment of FIGS. 1-4 and FIGS. 6-7. In such case, the shape of the resultant molded object will be circular, as shown, for example, in FIGS. 16 and 17.

Figure 20:
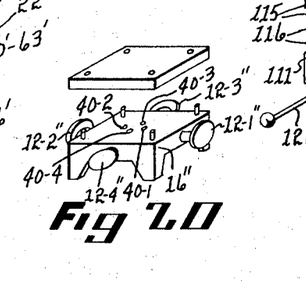
FIG. 20 is a perspective view, partially exploded, of a modification of the toy embodiment depicted in FIGS. 1–4 in which separate orifices associated with different ones of the injection mechanisms are provided.

If desired, in the toy embodiment depicted in FIGS. 1-4, the single orifice 40 which communicates at its lower end with each of the reservoirs 30 of the injection mechanisms 12-1 to 12-4 via passages 41 may be substituted by a plurality of orifices, such as shown in FIG. 20. In accordance with the modification depicted in FIG. 20, four orifices, identified by reference numerals 40-1, 40-2, 40-3 and 40-4, are provided in the lower mold member 16" which communicates separately with reservoirs 30" (not shown) of injection mechanisms 12-1" to 12-4". In addition to providing a variant of the coloring and design of the patterns shown in FIGS. 13-18, the use of four separate orifices communicating respectively with the reservoirs 30" of the four injection mechanisms 12-1" to 12-4" eliminates the need for one-way, or check, valves of the type identified by reference numeral 56 should collapsible supply tubes be used of the type shown in the modification depicted in FIG. 5 and identified by reference numeral 50.

Figure 8:
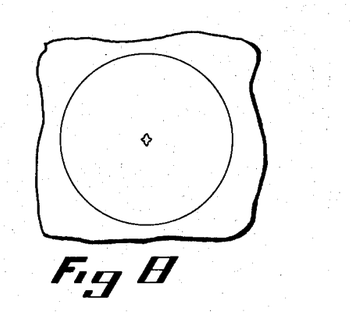
FIG. 8 is a plan view of a modified form of orifice useful in connection with the toy embodiments of this invention.
Figure 9:
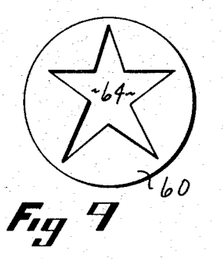
FIGS. 9–12 are plan view of different masks useful with the toy embodiments of this invention for producing differently shaped particles.
Figure 10:
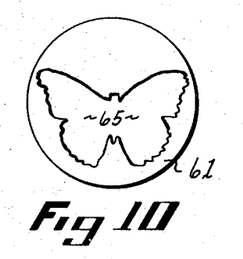
Figure 11:
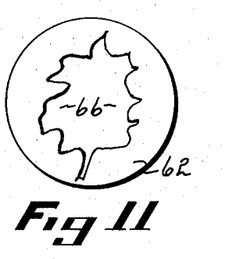
Figure 12:
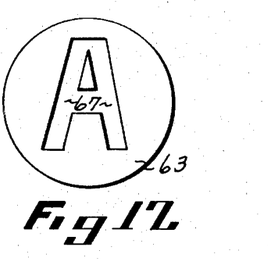

In accordance with certain additional modifications of the toys of this invention, the cross-section of the orifices 40, 93, 118 40', and 40-1 to 40-4 of the devices of FIGS. 1-4, FIGS. 6-7 and FIG. 21, FIG. 19, and FIG. 20 can be modified from circular to some other desired shape, such as cruciform-shaped (shown in FIG. 8), star-shaped, rectangular, or the like. Modification of the orifices in the manner indicated produces variants of the patterns depicted in FIGS. 13-18.

The flowable material for use with the toy of this invention can take a variety of forms. For example, the flowable material can take the form of a modeling compound marketed by Rainbow Craft, Inc. of Cincinnati, Ohio, under the Trademark PLAY-DOH. Such composition has a composition and is produced by methods disclosed in U.S. Pat. No. 3,167,440 in the name of McVicker et al., issued Jan. 26, 1965. When flowable materials of the foregoing type are utilized, the article once molded is readily peelable from the mold cavity and when allowed to dry for a period of approximately 24 hours hardens to form a rigid disc-shaped article. It has been found that discs fabricated of the foregoing material allowed to dry on a sheet of wax paper will gently curl, becoming rigidified in a non-planar configuration. It has also been found that if molded discs of the foregoing material are allowed to dry on a sheet of felt, or similar porous material, the molded disc will rigidify in a substantially planar configuration. Obviously, other flowable materials other than the type specifically noted may be utilized. For example, modeling clay of conventional, commercially available varieties utilized by children for arts and crafts purposes can be used. Also, viscous paints, plastisols, water soluble plastics, inks and other flowable materials may be used. It is also possible to use flowable powdered material which, upon suitable compression, becomes a coherent mass.

The various embodiments of the toy of this invention have been described as preferably having at least a portion of the mold fabricated of transparent material to facilitate viewing of the interior of the molding cavity during the injection process as well as for viewing the injection mechanism, particularly the reservoir. By fabricating the mold such that the molding cavity can be observed by the user during the molding process a number of advantages are provided. For example, the user can monitor the progress of the injection process at different stages. This is both amusing in that the user sees the molded object as it is actually taking shape, as well as affords the user the opportunity to continuously alter any preconceived plan of color and/or quantity injection if the user is at any time dissatisfied with the color and/or design of the patterned disc being produced. Visually observing the molding cavity during the molding process is also an advantage because it enables the user to visually observe when the molding of the object has been finished and the object completed. By enabling the user to visually observe the injection mechanism, particularly the reservoir containing the flowable molding material, the user is in a position to continuously monitor the supply of flowable material remaining in the various reservoirs and replenish as needed.

Of course, it will be understood by those skilled in the art that while the mold preferably is made to permit viewing of the molding cavity during the molding process, this feature of the toy may be eliminated if the various advantages noted above attributable thereto are not desired. Also, while it is preferred that the mold be such that the injection mechanism, particularly the reservoirs, can be visually observed during the molding process, this feature can also be eliminated if the advantage it provides, noted above, is not desired.

The toy of this invention, by virtue of one or more of its structural or operational characteristics, provides a number of other advantages. For example, the toy is certain of its forms may be fabricated of an absolute minimum number of parts, of which still fewer in number are movable. For example, in the embodiment of FIGS. 6 and 7 a toy is provided in which there are principally only four elements, namely, a lower molding member, an upper molding member, a piston, and a clamp of which only the piston is movable. Such a toy is easy to fabricate and assemble, and hence represents the ultimate in manufacturing economy. In addition to requiring an absolute minimum of parts, the toy of this invention is advantageous because it permits inexpensive materials, such as plastics, to be utilized without sacrifice of toy quality, further reducing the cost of the toy.

The toy of this invention is also economical from the standpoint that the quantity of flowable material used is minimal. A 2½ inches diameter patterned disc of variable design and coloration can be produced which, because of the relatively small thickness of the disc, requires an absolute minimum of flowable material. The resultant disc, notwithstanding its relatively small thickness, is nevertheless entirely functional, affording all of the advantages of color and design variation of objects having a much larger disc thickness and which necessarily utilize significantly more material.

The toy of this invention is also very durable. For example, the embodiment of FIGS. 6 and 7 is virtually indestructable. It can be dropped without impairing its future use, and in fact materially resists even deliberate and intentional acts of destruction.

Another important advantage of the toy of this invention is that it is easy and uncomplicated to use. In its simplest form all that is required is to charge the open end of a hollow tube with flowable material and thereafter with the upper and lower mold members clamped, urge a piston rod into the hollow tube. Even the youngest of children can rapidly learn and easily use the invention.

Finally, the toy permits patterned discs to be fabricated which are practically infinite both as to the design of the patterned disc and its coloration.

Having described the invention, what is claimed is:

1. An injection molding toy for creating thin disc shaped objects of uniform thickness from flowable material by injection molding, said toy comprising:
    an injection mold having a shallow molding cavity with a periphery, into which cavity flowable material can be injected to produce a thin disc;
    said mold including a pair of cooperating molding members each defining a respective one of a pair of opposed, smooth, closely spaced mold surfaces disposed in substantial parallelism;
    said cavity lying between said opposed surfaces and being substantially defined by said surfaces;
    one of said members having at least one orifice therein communicating with said cavity through one of said surfaces and communicating with said cavity at a point remote from the periphery of said cavity;
    at least one of said members including transparent viewing panel to permit at least a portion of said cavity to be visually observed when flowable material is injected into said cavity; and
    at least one injector mechanism communicating with said orifice to facilitate the sequential injection of successive charges of flowable material through said orifice and into said cavity, said mold surfaces being spaced sufficiently close to provide that each successive charge flows outwardly between said opposed mold surfaces to radially advance the preceding charge toward said periphery without substantial mixing of charges with said cavity, thereby producing a thin disc of uniform thickness having annular rings at increasingly larger radii which, throughout substantially the entire thickness thereof, correspond to said successively different charges of material.

2. A toy according to claim 1 wherein:
    said orifice is located generally centrally of said surface.

3. A toy according to claim 1 wherein said injector mechanism includes:
    a reservoir associated with the orifice bearing member and communicating with said molding cavity via said orifice;
    a piston manually movable within said reservoir for injecting into said molding cavity via said orifice flowable material stored in said reservoir; and
    a reservoir-charging passage communicating at one end with said reservoir and at the other end with an external surface of said one of said members, which other end is accessible to facilitate insertion of flowable material into said reservoir via said reservoir-charging passage.

4. An injection molding toy for creating thin disc shaped objects of uniform thickness from flowable material by injection molding, said toy comprising:
    an injection mold having a shallow molding cavity with a periphery into which flowable material can be injected to produce a thin disc;
    said mold including a pair of cooperating molding members each defining a respective one of a pair of opposed, smooth, closely shaped mold surfaces disposed in substantial parallelism;
    said cavity lying between said opposed surfaces and being substantially defined by said surfaces;
    one of said members having at least one orifice therein communicating with said cavity through one of said surfaces, said orifice being generally perpendicular to the surface opposite said orifice;
    at least one of said members including a transparent viewing panel to permit at least a portion of said cavity to be visually observed when flowable material is injected into said cavity; and
    at least one injector mechanism communicating with said orifice to facilitate the sequential injection of successive charges of flowable material through said orifice and into said cavity, said mold surfaces being spaced sufficiently close to provide that each successive charge flows outwardly between said opposed mold surfaces to radially advance the preceding charge toward said periphery without substantial mixing of charges within said cavity, thereby producing a thin disc of uniform thickness having angular rings at increasingly larger radii which, throughout substantially the entire thickness thereof, correspond to said successively different charges of material.

5. A toy according to claim 4 wherein:
    said orifice is located generally centrally of said surface.

6. An injection molding toy for creating thin disc shaped objects of uniform thickness from flowable material which upon compression forms a coherent mass, said toy comprising:
    an injection mold having a shallow molding cavity with a periphery into which flowable material can be injected to produce a thin disc;
    said mold including a pair of cooperating molding members each defining a respective one of a pair of opposed, smooth, closely spaced mold surfaces disposed in substantial parallelism;

said cavity lying between said opposed surfaces and being substantially defined by said surfaces;

one of said members having at least one orifice therein communicating with said cavity through one of said surfaces and communicating with said cavity at a point remote from the periphery of said cavity;

at least one of said members including a transparent viewing panel to permit at least a portion of said cavity to be visually observed when flowable material is injected into said cavity; and means for sequentially injecting successive charges of said flowable material through said orifice and into said cavity, and for forcing said material to flow radially in all directions from said orifice between said surfaces, said mold surfaces being spaced sufficiently close to provide that each successive charge flows outwardly between said opposed mold surfaces to radially advance the preceding charge toward said periphery without substantial mixing of charges within said cavity, thereby producing a thin disc of uniform thickness having annular rings at increasingly larger radii which, throughout substantially the entire thickness thereof, correspond to said successively different charges of material.

7. A toy for creating thin disc shaped objects of uniform thickness from flowable material comprising:

a block having a smooth molding surface zone with a periphery and a non-molding surface zone;

a smooth transparent viewing panel movable between a molding position in which said panel overlies said molding surface zone in close spaced parallel relationship thereto to define therewith a shallow molding cavity for producing a thin disc of uniform thickness, and a non-molding position in which said molding zone is accessible;

clamp means to selectively maintain said panel and block in said molding position;

a reservoir formed in said block and having intake and discharge ends;

an orifice formed in said block communicating at one end with said molding zone surfaces of said block at a point away from said periphery of said molding zone surface and at the other end with said discharge end of said reservoir, a reservoir-charging passage formed in said block communicating at one end with said intake end of said reservoir and at the other end with said non-molding zone surface to facilitate charging said reservoir with flowable material when said viewing plate is in said molding position; and a piston movable in said reservoir for sequentially injecting into said cavity successive charges of flowable material positioned in said reservoir via said passage, said mold surfaces being spaced sufficiently close to provide that each successive charge flows outwardly between said opposed mold surface zone and panel to radially advance the preceding charge toward said periphery without substantial mixing of charges within said cavity, thereby producing a thin disc of uniform thickness having annular rings at increasingly larger radii which, throughout substantially the entire thickness thereof, correspond to said successively different charges of material.

8. A toy for use by a child in creating thin disc-shaped objects of uniform thickness, having multi-colored patterns which are continuously variable at the discretion of the child, from a plurality of different colored cohesive charges of flowable material, and for presenting the flow of said material for continuous visual observation by the child at various stages of the objects' creation, said toy comprising:

an injection mold having a shallow molding cavity with a periphery into which flowable material can be injected to produce a thin disc;

said mold including a pair of cooperating molding members each defining a respective one of a pair of opposed, smooth, closely spaced mold surfaces disposed in substantial parallelism;

said cavity lying between said opposed surfaces and being substantially defined by said surfaces;

one of said members having at least one orifice therein communicating with said cavity through one of said surfaces and communicating with said cavity at a point remote from the periphery of said cavity;

at least one of said members including a transparent viewing panel to permit at least a portion of said cavity to be visually observed when flowable material is injected into said cavity;

means for sequentially injecting successive charges of said flowable material into said cavity through said orifice, and for successively forcing said sequential charges of material in said cavity to flow radially from said orifice between said surfaces through pressure exerted through other masses of said material entering said cavity through said orifice, whereby multicolored patterns are continuously visually observable through said viewing panel at various stages of creation of said objects;

said injecting means being capable of free manual manipulation at any time during the operation thereof, between a loading condition in which charges of colored material can be added, and an injecting condition in which loaded charges of material are sequentially injected into said mold, whereby said patterns are continuously variable, during the creation thereof, at the discretion of the child operating the toy;

said injecting means including:

a. a reservoir communicating at one end thereof with said orifice, and having an intake opening communicating with said reservoir at a point remote from said orifice, b. a piston freely movable in said reservoir between a loading position away from said orifice to an injecting position toward said orifice, and c. a manually movable handle, external of said reservoir, connected to said piston through an opening in said reservoir, d. said reservoir defining a path from said intake to said orifice which is sufficiently straight so that successive charges of material loaded into said reservoir through said intake will be sequentially injected through said orifice without substantial mixing, said mold surfaces being spaced sufficiently close to provide that each successive charge flows outwardly between said opposed mold surface zone and panel to radially advance the preceding charge toward said periphery without substantial mixing of charges within said cavity, thereby producing a thin disc of uniform thickness having annular rings at increasingly larger radii which, throughout substantially the entire thickness thereof, correspond to said successively different charges of material.

9. A toy according to claim 8 wherein:
said orifice is located generally centrally of said surface.

10. A toy for creating, from flowable material by injection molding, thin disc-shaped objects of uniform thickness having a multi-colored ringed design, said toy comprising:
a injection mold having a shallow molding cavity with a periphery, into which cavity flowable material can be injected to produce a thin disc of uniform thickness;
said mold including a pair of cooperating molding members each defining a respective one of a pair of opposed, smooth, closely spaced mold surfaces disposed in substantial parallelism;
said cavity lying between said opposed surfaces and being substantially defined by said surfaces;
one of said members having at least one orifice therein communicating with said cavity through one of said surfaces and communicating with said cavity at a point remote from the periphery of said cavity;
at least one of said members including a transparent viewing panel to permit at least a portion of said cavity to be visually observed when flowable material is injected into said cavity; and
at least one injector mechanism communicating with said orifice to facilitate the sequential injection of successive charges of flowable material through said orifice and into said cavity, said mechanism including different charges of flowable material of multiple colors arranged in said mechanism to be sequentially injected through said orifice into said cavity when said injector mechanism is actuated, said mold surfaces being spaced sufficiently close to provide that each successive charge flows outwardly between said opposed mold surfaces to radially advance the preceding charge toward said periphery without substantial mixing of charges within said cavity, thereby producing a thin disc of uniform thickness having annular rings of different colors at increasingly larger radii with correspond throughout substantially the entire thickness thereof, to said successively differently colored charges of material.

11. A toy according to claim 10 wherein:
said orifice is located generally centrally of said surface.

12. A toy for creating, from flowable material by injection molding, thin disc-shaped objects of uniform thickness having a multi-colored design, said toy comprising:
an injection mold having a shallow molding cavity with a periphery, into which cavity flowable material can be injected to produce a thin disc;
said mold including a pair of cooperating molding members each defining a respective one of a pair of opposed, smooth, closely spaced mold surfaces disposed in substantial parallelism;
said cavity lying between said opposed surfaces and being substantially defined by said surfaces;
one of said members having at least one orifice therein communicating with said cavity through one of said surfaces and communicating with said cavity at a point remote from the periphery of said cavity;
at least one of said members including a transparent viewing panel to permit at least a portion of said cavity to be visually observed when flowable material is injected into said cavity; and
at least one injector mechanism communicating with said orifice to facilitate the sequential injection of successive charges of flowable material through said orifice and into said cavity, said mechanism including different charges of flowable material of multiple colors distinctly arranged in said mechanism to be sequentially injected through said orifice into said cavity when said injector mechanism is actuated, said mold surfaces being spaced sufficiently close to provide that each successive charge flows outwardly between said opposed mold surfaces to radially advance the preceding charge toward said periphery without substantial mixing of charges within said cavity, thereby producing a thin disc of uniform thickness having annular rings of different colors at increasingly larger radii which, throughout substantially the entire thickness thereof, correspond to said successively differently colored charges of material.

13. A toy according to claim 10 wherein:
said orifice is located generally centrally of said surface.

* * * * *

UNITED STATES PATENT OFFICE
CERTIFICATE OF CORRECTION

PATENT NO. : 3,859,020
DATED : January 7, 1975
INVENTOR(S) : Robert I. Rentz

It is certified that error appears in the above-identified patent and that said Letters Patent are hereby corrected as shown below:

Column 1, Line 14, change "not" to --now--.

Column 1, Line 35, change "structure" to --structures--.

Column 2, Line 15, change "patterend" to --patterned--.

Column 4, Line 1, change "view" to --views--.

Column 6, Line 14, change "verticalaly" to --vertically--.

Column 7, Line 49, change "make" to --take--.

Column 7, Line 54, change "makes" to --masks--.

Column 12, Line 60, change "is" to --in--.

Signed and sealed this 1st day of July 1975.

(SEAL)
Attest:

RUTH C. MASON
Attesting Officer

C. MARSHALL DANN
Commissioner of Patents
and Trademarks